March 24, 1953     N. L. McCREIGHT ET AL     2,632,285
ELECTRIC ROW-CROP THINNING MACHINE
Filed Sept. 24, 1948     2 SHEETS—SHEET 2
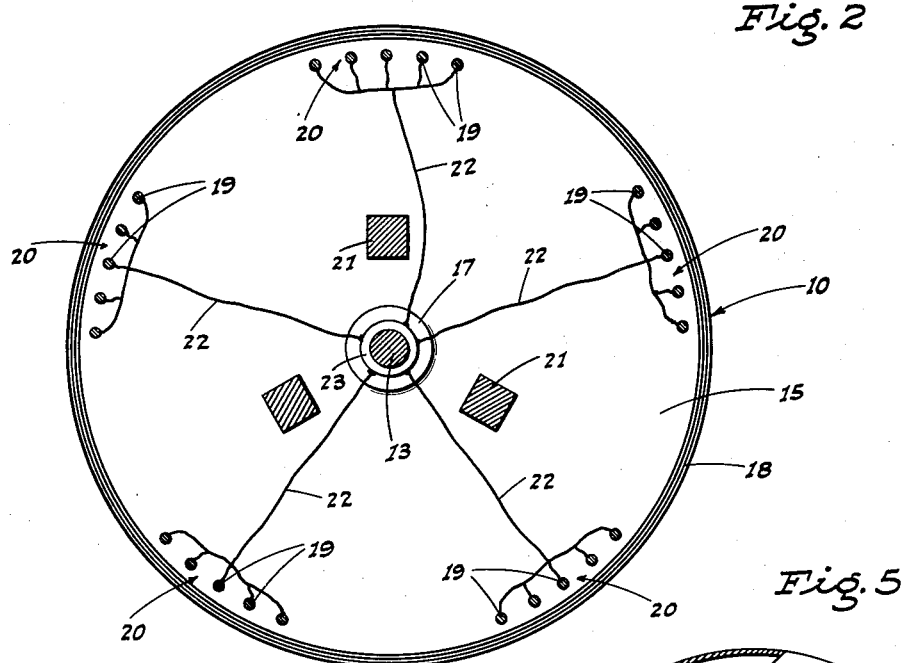
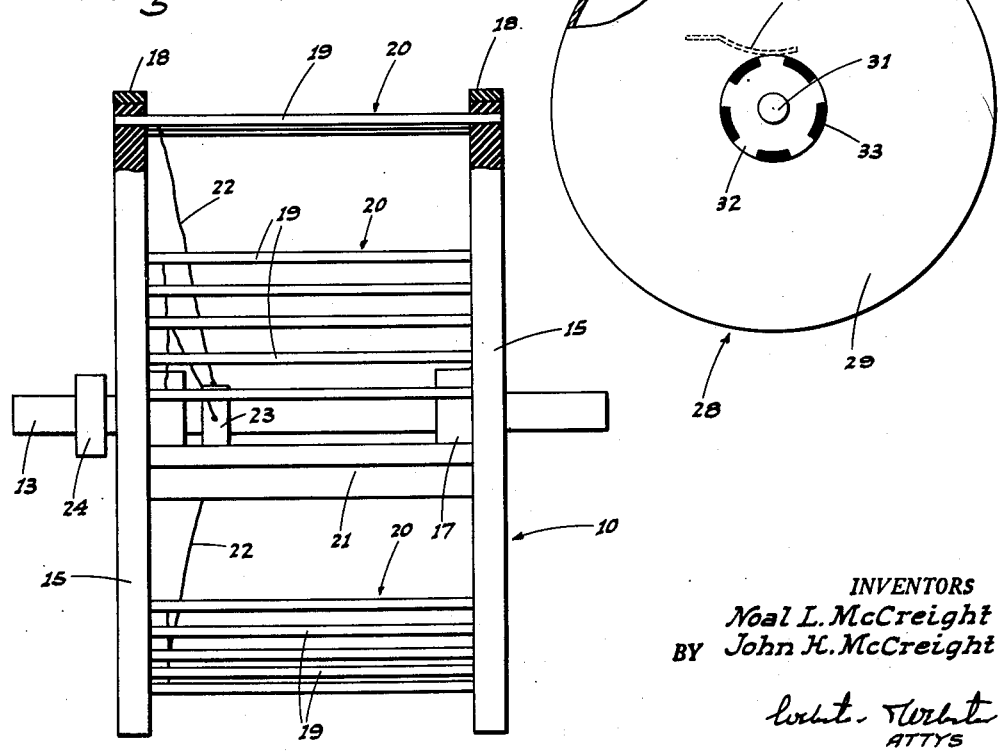
INVENTORS
Noal L. McCreight
BY John H. McCreight
ATTYS Patented Mar. 24, 1953

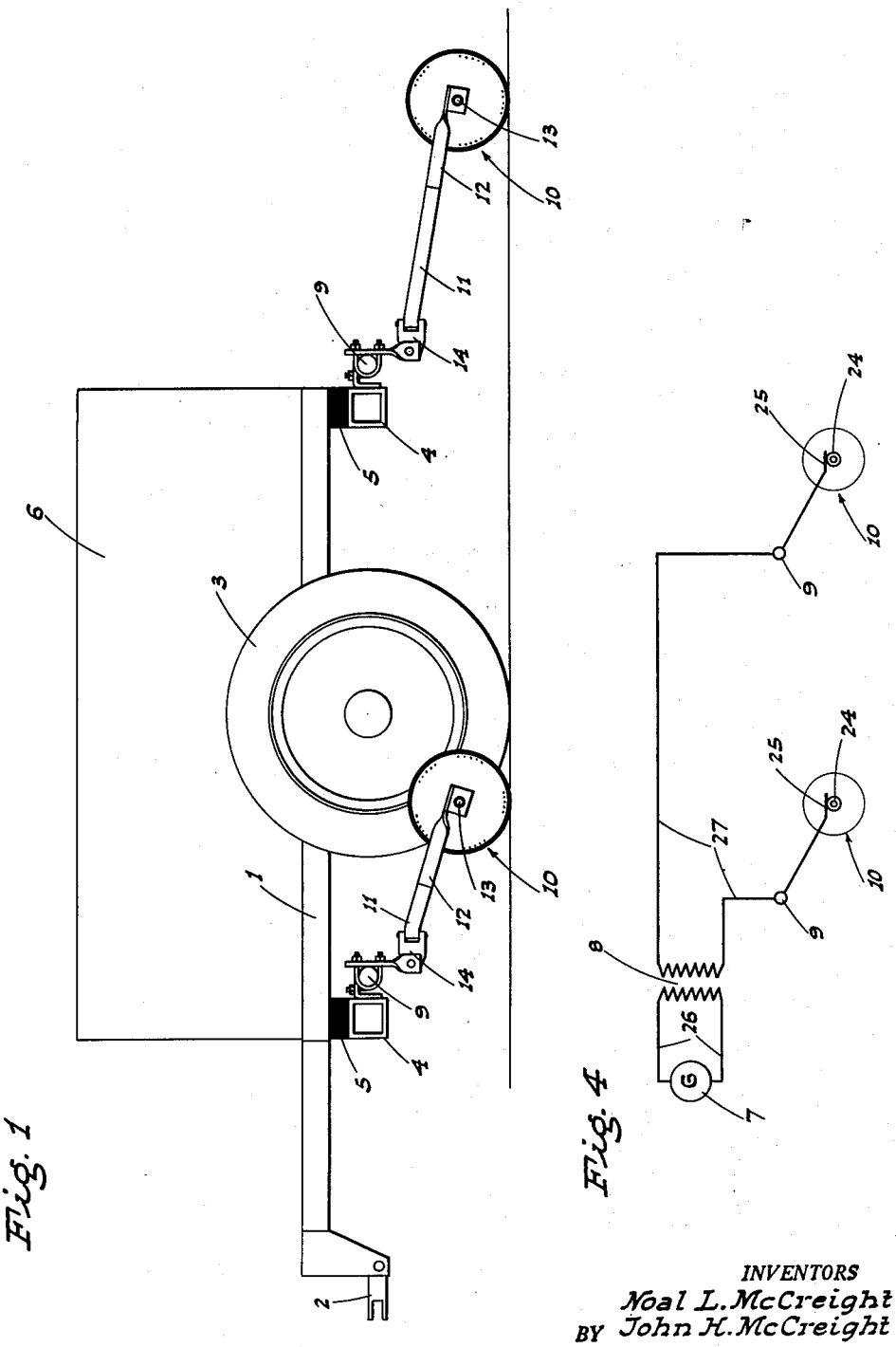

2,632,285

UNITED STATES PATENT OFFICE 2,632,285

ELECTRIC ROW-CROP THINNING MACHINE

Noal L. McCreight and John H. McCreight, San Jose, Calif., assignors of one-third to Cortes L. Valentine Application September 24, 1948, Serial No. 50,904

11 Claims. (Cl. 47—1.3)

This invention is directed to, and it is an object to provide, a novel method and machine for blocking out young plants at spaced, predetermined points along a crop row whereby to permit of full growth of the remaining plants; the destruction of the plants to be blocked being accomplished by subjecting the same to high voltage electrical energy.

Another object of the invention is to provide a plant blocking machine, for electrical blocking of row crops, as above, which includes a novel plant-contact assembly for subjecting the plants in a row to the electrical energy only at said predetermined spaced points; such contact assembly including plant engaging contact drums or rollers of unique design and function.

A further object of the invention is to provide a machine, as in the preceding paragraph, which includes an electric circuit which is especially effective for the purpose; such circuit including, in connection with each of the sides or leads of the circuit, at least one of said rollers, and the latter being spaced apart a substantial distance in the direction of travel, for completion of the circuit—by ground—therebetween and without possibility of arcing between said rollers.

An additional object of the invention is to provide a machine, for electrical blocking of row crops, which is designed for ease and economy of manufacture, and long life with a minimum of service or maintenance.

A further object of the invention is to provide a practical and reliable method and machine for blocking row crops, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the machine.

Fig. 2 is an enlarged sectional elevation of one of the contact rollers.

Fig. 3 is an end elevation, partly in section, of one of the contact rollers, detached.

Fig. 4 is a diagram of the electrical circuit which the machine preferably employs.

Fig. 5 is a side elevation, partly broken away, of a modified form of contact roller.

Referring now more particularly to the characters of reference on the drawings, and at present to Figs. 1-4, exclusive, the machine comprises a vehicle, indicated generally at 1, which is here of trailer type and includes a hitch 2 for connection to a motor vehicle.

The vehicle 1 is supported, on opposite sides, by rubber-tired wheels 3, and includes cross beams 4 ahead, and to the rear, of said wheels; said cross beams being insulated from the remainder of the vehicle by insulation blocks 5.

A body 6 is included in the vehicle 1 and houses a motor driven generator and a transformer, shown diagrammatically at 7 and 8, respectively, in Fig. 4.

Each of the cross beams 4 is fitted, at the rear thereof, with a transverse mounting bar 9, and one or more plant engaging contact drums or rollers, indicated generally at 10, trail each mounting bar 9. If there are more than one of the rollers 10 trailing either of the mounting bars 9, such rollers are in transversely spaced relation.

The rollers 10 are connected in draft relation to the transverse mounting bars 9 as follows:

A draft tongue 11 projects forwardly from each roller at a slight upward incline, and such draft tongue 11 includes a fork 12 at its rear end, which straddles the corresponding roller 10 and is connected to the axle 13 thereof in draft relation to said roller. At its forward end each draft tongue 11 is coupled, by a swivel hitch 14, to the transverse mounting bar 9.

The rollers 10 are each of identical construction and therefore a description of one will suffice for all.

Each plant engaging contact roller 10 comprises a pair of axially spaced, dielectric side discs 15 fixed on a cross shaft 16 by hubs 17; said discs 15 being fitted—peripherally—with annular rubber bands or tires 18, whereby to prevent undue wear on the discs 15.

A plurality of metallic cross rods 19 extend between, and are secured in connection with, the side discs 15 radially inwardly a short distance from the tires 18 and substantially equally spaced from the cross shaft 16. The cross rods 19 are in circumferentially spaced sets 20; the spacing between such sets being predetermined, and the rods in each set being in adjacent but spaced-apart relation.

Axial separation of the side discs 15 is prevented by transverse tie bars 21 which connect therebetween inwardly of the sets 20 of cross rods 19.

Each set 20 of cross rods 19 is connected by a branched lead 22 with a metallic connection collar 23 affixed on the cross shaft 16 between the side discs 15.

Outwardly of one side disc 15 of each roller 10 there is a contact ring 24 affixed to the cross shaft 16, and a wiper blade 25 runs on said contact ring.

The circuit for the machine is illustrated in Fig. 4. As previously indicated, the motor generator 7 and transformer 8 are mounted within the body 6; such generator being connected by leads 26 with the input of the transformer 8, while the output of such transformer is connected to leads 27. The leads 27 are omitted from all figures except Fig. 4, for the purpose of clarity.

One of the leads 27 connects to the wiper blade 25 of a roller 10 (or rollers) trailing the front bar 9, while the other lead 27 connects to the wiper blade 25 of a roller 10 (or rollers) trailing the rear bar 9. The circuit comprised of leads 27, and the longitudinally spaced-apart rollers 10, can thus be completed only through the ground between said rollers, and—as they are a substantial distance apart—arcing between said rollers cannot occur.

The machine functions as follows to accomplish effective row crop blocking:

The vehicle 1 is advanced along crop rows with the rollers 10 each running atop a row wherein relatively small or young plants exist in closely planted relation.

As the vehicle 1 moves forwardly the sets 20 of cross rods 19 successively engage plants in the corresponding row at predetermined spaced points. The sets 20 of cross rods 19 are charged with very high voltage electrical energy from the transformer 8 through the described circuiting, and thus when such sets of rods engage plants in the row such plants are effectively destroyed as they come into contact with the rods. In other words, blocking of the crop in a row is accomplished by subjecting the plants at spaced blocking points to high voltage electrical energy; the circuit being closed from the rods 19, through the plants, to ground.

The spacing between the blocking points in any given row is predetermined by the spacing of the sets 20 on each roller 10. If desired, the cross rods 19 may be adjustably mounted in the side discs 15, whereby such spacing can be altered selectively.

The front and rear rollers 10 are in such relative rotative positions that upon advance of the vehicle 1 corresponding sets 20 of cross rods 19 come into a plant blocking position at the same time.

In Fig. 5 there is illustrated a modified type of the plant engaging contact roller. In this embodiment the roller, indicated generally at 28, is of all metal construction, including metallic side discs 29, and a continuous periphery 30. The cross shaft 31 of the roller 28, which serves as the mounting element, carries beyond one side disc 29 a contact ring 32 in the nature of a commutator. This contact ring 32 includes, at circumferentially but evenly spaced points, a plurality of inserted dielectric segments 33. The wiper blade which runs on the contact ring 32 is indicated at 34. In this embodiment, with rotation of the roller 28, the electrical charge of the roller 28 is interrupted, each time that the wiper blade 34 rides a dielectric segment 33, thus accomplishing the desired blocking only at predetermined spaced points in a crop row. It has been found by experimentation that with a relatively light roller 28 the periphery 30 may be continuous and run over all of the plants without damage to those which are to remain for growth.

The invention provides a machine, and a method, operative to accomplish effective and rapid automatic or non-manual blocking of plants in row crops; the blocked plants, after their electrical destruction, remaining along the row to provide humus.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A row crop blocking machine comprising a vehicle adapted to move along a crop row, a source of high electrical energy at the vehicle, a plant engaging and contact roller trailing from a part of the vehicle and running on the crop row, the roller including circumferentially spaced contact elements which thus engage plants in the row only at predetermined longitudinally spaced points, and circuit means between said source and elements charging the latter with said high electrical energy.

2. A row crop blocking machine comprising a vehicle adapted to move along a crop row, a source of high electrical energy at the vehicle, a plant engaging and contact roller trailing from a part of the vehicle and running longitudinally over the crop row, the roller including contact elements which engage plants in the row only at predetermined longitudinally spaced points, and circuit means between said source and elements charging the latter with said high electrical energy; said roller comprising a shaft, and end discs thereon, said elements being circumferentially spaced cross rods extending between said end discs.

3. A machine, as in claim 2, in which the end discs are dielectric; said circuit means including electric connections between the rods and shaft.

4. A machine, as in claim 3, in which said circuit means includes a wiper blade and ring unit on the shaft beyond one end of the roller.

5. A row crop blocking machine comprising a vehicle adapted to move along a crop row, a source of high electrical energy at the vehicle, a plant engaging and contact roller trailing from a part of the vehicle and running longitudinally over the crop row, circumferentially spaced plant contact elements on the roller adjacent its periphery, and circuit means between said source and said elements charging the latter with said high electrical energy.

6. A row crop blocking machine comprising a vehicle adapted to move along a crop row, a source of high electrical energy at the vehicle, a plant engaging and contact roller trailing from a part of the vehicle and running longitudinally over the crop row, circumferentially spaced plant contact elements on the roller adjacent its periphery, and circuit means between said source and said elements charging the latter with said high electrical energy; said elements being cross rods in circumferentially spaced sets, the rods of each set being in adjacent but spaced relation.

7. A machine, as in claim 5, in which the roller includes dielectric side discs, and said elements being cross rods extending between the discs.

8. A machine, as in claim 5, in which the roller includes dielectric side discs, and said elements being cross rods extending between the discs in circumferentially spaced sets, the rods of each set being in adjacent but spaced relation.

9. A machine, as in claim 7, including rubber tires on the periphery of each disc.

10. A row crop blocking machine comprising a vehicle adapted to move along a crop row, a source of high electrical energy at the vehicle, a pair of plant engaging and contact rollers trailing from parts of the vehicle in substantially spaced relation in the direction of travel and running longitudinally over the crop row, each roller including a plurality of circumferentially spaced plant contact elements, and circuit means between said source and elements of each roller charging the elements with said high electrical energy.

11. A row crop blocking machine comprising a vehicle adapted to move along a crop row, a plant engaging and contact device connected in drive relation to the vehicle and running on said row, and means to intermittently charge said device with high electrical energy so as to destroy plants then engaged; said device including a metallic roller, the roller being peripherally continuous, and said means being a commutator unit connected to the roller.

NOAL L. McCREIGHT.
JOHN H. McCREIGHT.

REFERENCES CITED

The following references are of record in the file of this patent:

UNITED STATES PATENTS

| Number | Name | Date |
|---|---|---|
| 492,635 | Sharp | Feb. 28, 1893 |
| 546,682 | Scheibel | Sept. 24, 1895 |
| 1,786,661 | Laird | Dec. 30, 1930 |
| 2,007,383 | Opp | July 9, 1935 |
| 2,089,451 | Tolar | Aug. 10, 1937 |
| 2,243,891 | Topel et al. | June 3, 1941 |
| 2,429,412 | Keller | Oct. 21, 1947 |
| 2,484,443 | Baker | Oct. 11, 1949 |
| 2,557,303 | McLemore et al. | June 19, 1951 |
| 2,607,165 | Rainey | Aug. 19, 1952 |

FOREIGN PATENTS

| Number | Country | Date |
|---|---|---|
| 2,968 | Australia | of 1921 |